Patented Oct. 16, 1923.

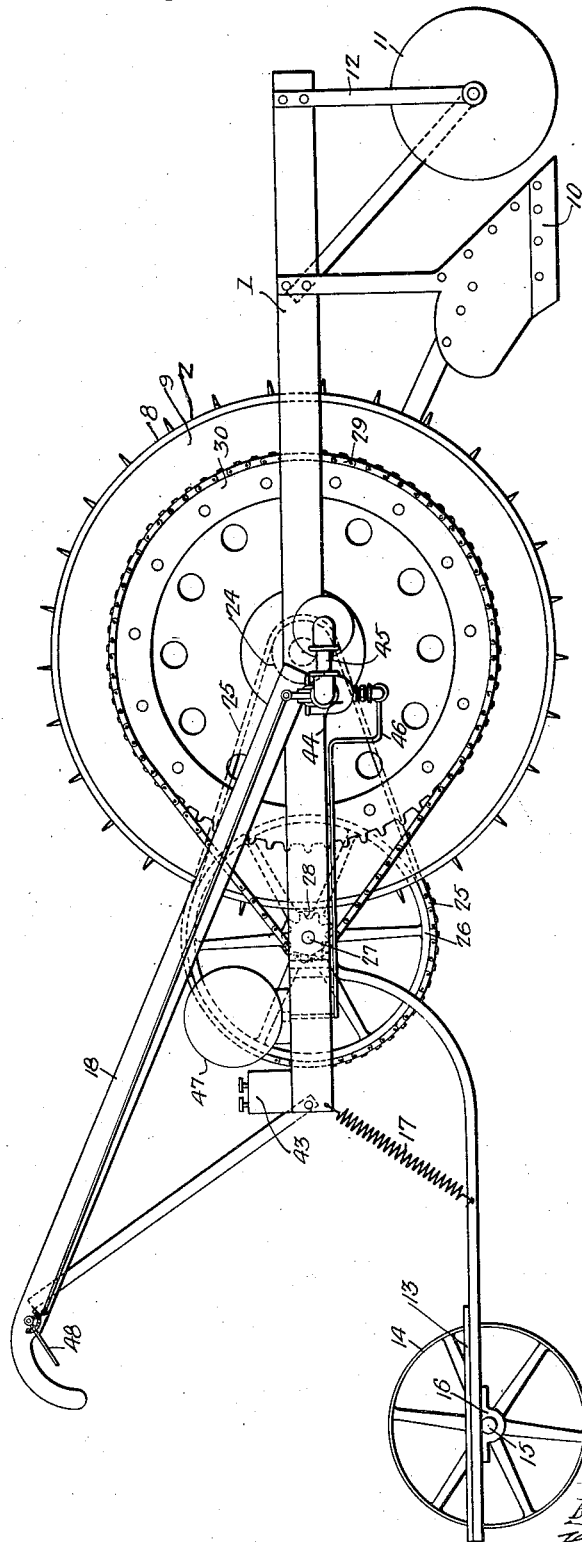

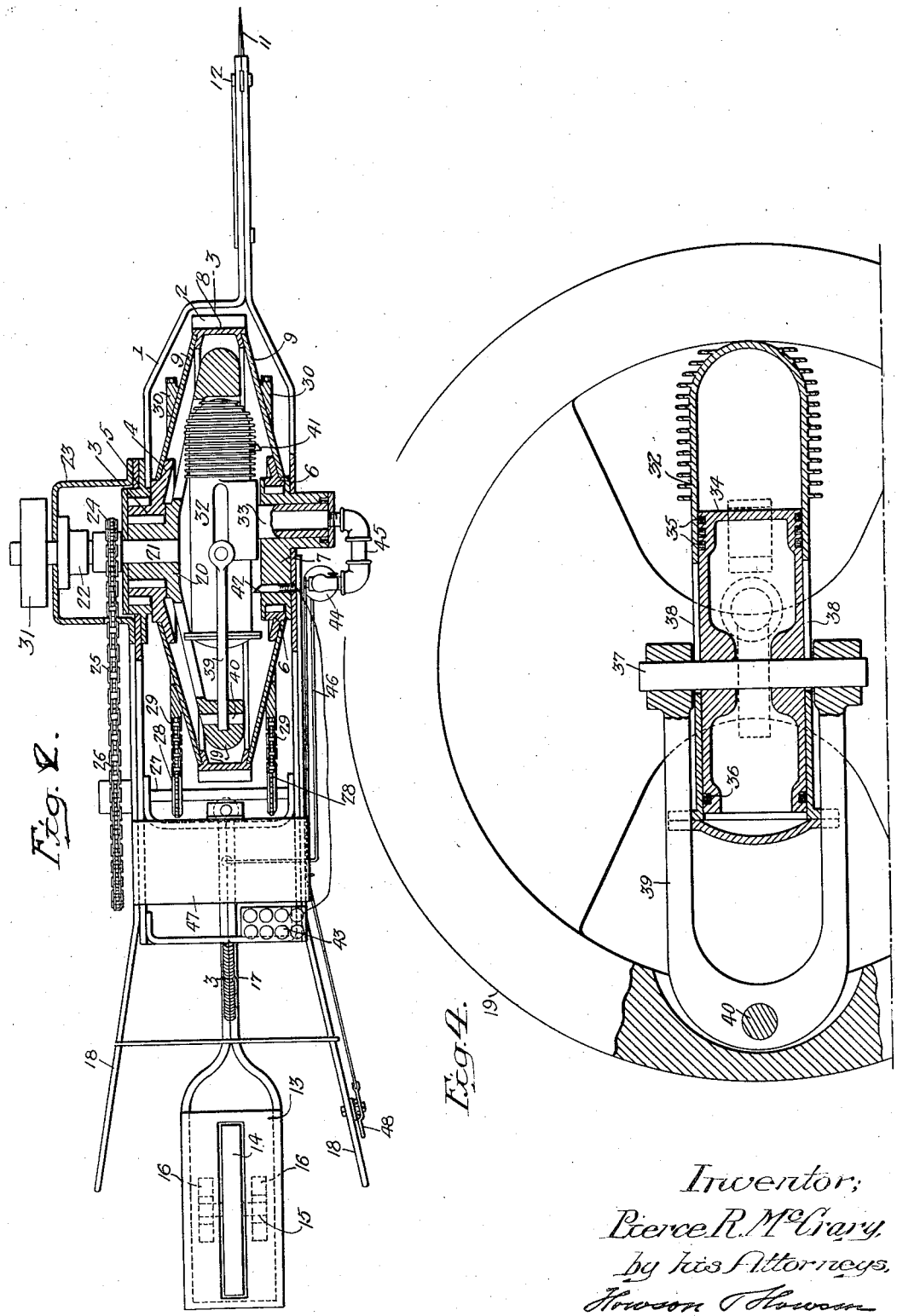

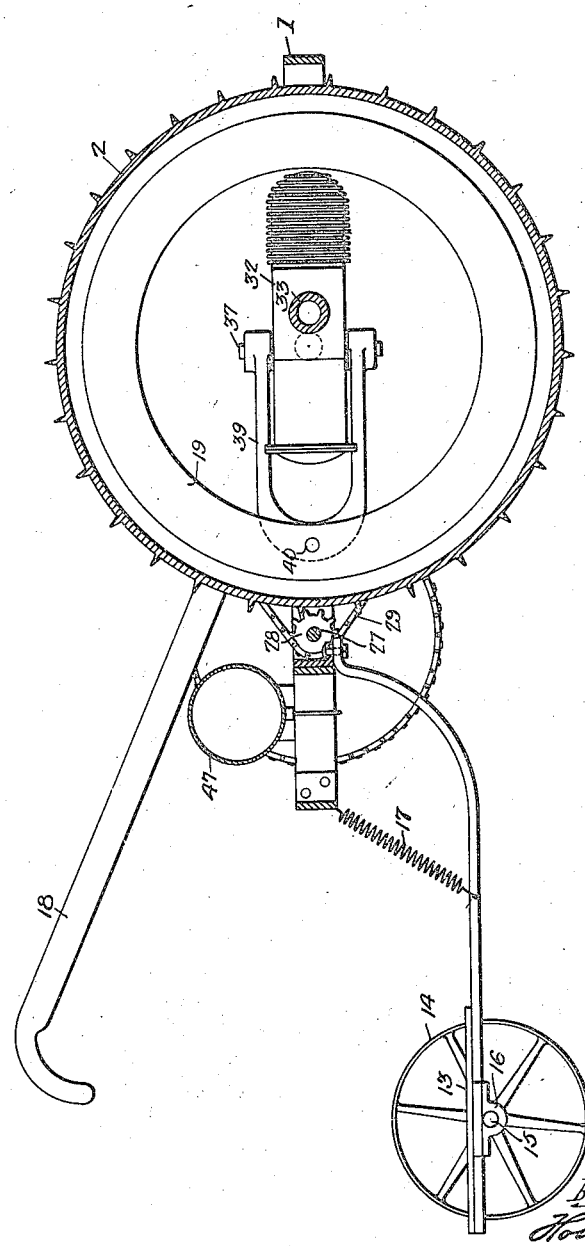

1,471,180

UNITED STATES PATENT OFFICE.

PIERCE R. McCRARY, OF LAKELAND, FLORIDA, ASSIGNOR OF ONE-HALF TO CHRISTOPHER H. R. WOODWARD, OF PORTSMOUTH, NEW HAMPSHIRE.

MOTOR-DRIVEN PLOW.

Application filed September 17, 1918, Serial No. 254,453. Renewed May 1, 1923.

*To all whom it may concern:*

Be it known that I, PIERCE R. McCRARY, a citizen of the United States, and a resident of Lakeland, county of Polk, State of Florida, have invented certain Improvements in Motor-Driven Plows, of which the following is a specification.

One object of my invention is to construct a comparatively small tractor plow so that it can be manufactured at a reasonable price, the cost being within the means of the ordinary farmer.

A further object of the invention is to construct the tractor plow with a single wheel to enable it to be readily turned and quickly manipulated.

A still further object of the invention is to provide a single wheel tractor plow in which the wheel travels in the furrow, the furrow providing an even bed for the wheel, thus increasing the traction of the wheel on the ground.

Another object of the invention is to mount on the plow a stabilizer so that the tendency of the single wheel plow will be to remain in a vertical position when the motor is in action.

Still another object of the invention is to provide a platform to support the operator while the plow is in motion.

In the accompanying drawings:

Fig. 1 is a side view of my improved tractor plow;

Fig. 2 is a sectional plan view;

Fig. 3 is a longitudinal sectional view on the line 3—3, Fig. 2, and

Fig. 4 is a sectional view on the line 3—3, Fig. 2, showing the cylinder and piston in section.

1 is the frame of the plow. 2 is the traction wheel having a trunnion 3 forming part of a hub 4. This trunnion is mounted in a bearing 5 secured to one side of the frame 1. On the opposite side of the wheel is a hub 6 mounted on a bearing 7 secured to the other side of the frame 1. The wheel, in the present instance, consists of the two hubs 4 and 6, a rim 8 and plates 9. On the rim are suitable ribs, or other projections, for engaging the ground. On the frame of the machine is the plowshare 10 including the plow point and mold board. This plow may be of any suitable type and located in front of the plow is the cutting disk 11 mounted on a frame 12, depending from the main frame 1. In the present instance, pivoted to the frame 1 at the rear of the wheel 2 is a platform 13 for the operator. The rear end of the platform is carried by a wheel 14, the trunnion 15 of which is mounted in bearings 16 secured to the platform. A spring 17 tends to lift the platform and its wheel so as to be clear of the ground, but it will yield readily when the operator steps upon the platform to operate the machine.

18 are the handles of the plow, of the ordinary construction, secured to the frame 1 and braced in any suitable manner. Mounted within the wheel is a stabilizing rotor 19. This rotor has a hub 20 mounted within the hub 4 of the wheel 2 and secured to this hub 20 is a shaft 21 adapted to a bearing 22 mounted on an extension 23 of the frame. On the shaft 21 is a sprocket wheel 24 around which passes a chain 25, in the present instance, of a sprocket wheel 26 of a jack shaft 27 mounted in bearings in the frame 1, and on this shaft are sprocket pinions 28 around which pass the chains 29, which also pass around the toothed rings 30, one on each side of the wheel to which they are secured, so that the wheel is driven from the rotor through the chains 25 and 29 and their sprocket wheels. On the end of the shaft, in the present instance, is a pulley 31, which can be used to drive any other machine, when the plow is suitably supported and the driving mechanism for the wheel 2 is disconnected. The machine need not be jacked up unless it is desired to use the wheel 2 as a fly wheel.

32 is the cylinder of an internal combustion engine, in the present instance, having a trunnion 33 mounted in the bearing 7 secured to the frame 1. This cylinder can be air cooled or water cooled, as desired. In the present instance, I have shown a series of ribs on a portion of the cylinder so as to provide means for air cooling. Located in the cylinder 32 is a piston 34, shaped as shown in Fig. 4, and having at one end a series of packing rings 35 and at the opposite end a single packing ring 36. Extending transversely through the piston 34 is a journal 37, which also extends through slots 38 in the cylinder 32 and connecting this journal 37 with the rotor 19 is a connecting rod 39. A pin 40 extends through the outer end of this rod and through the rim of the rotor 19. The rod, in the present instance, is U-shaped and extends on each side of the cylinder, as clearly shown in Fig. 4. On the cylinder is a spark plug 41 having a terminal which is in the path of the terminal 42 mounted in the bearing 7, which is connected to a battery 43 in the usual manner so that, as the engine rotates, the spark plug makes and breaks the circuit and causes a spark within the cylinder.

It will be understood that while I have shown a single cylinder engine of a particular type, the number of cylinders may be increased and motors of different types may be used.

44 is a carbureter, which communicates with the cylinder through the pipe 45, leading through the trunnion and also connected through a pipe 46 to the gasolene tank 47 mounted on the rear end of the frame 1. The gasolene passing through the carbureter is regulated by a lever 48 on one of the handles.

I have shown drive chains and sprocket wheels for driving the wheel 2, but it will be understood that belting, or gearing, may be used in some instances.

The operation of the machine is as follows:

The plow is set in a vertical position, then, by moving the lever 48, gasolene is supplied to the carbureter and on pushing the plow the stabilizing rotor will be turned, causing the terminal of the spark plug 41 to come in contact with the terminal 42. In the meantime, the carbureter has supplied the cylinder with a given quantity of gas and an explosion takes place, causing the rotor to move so that the parts connected with it will rotate and the plow will be driven forward. After the plow is set in motion, the operator can step upon the frame 13 and ride on the plow. The wheel 11 will cut the sod, or soil, and the plow proper, 10, will turn the furrow, and the driving wheel 2 is so located in respect to the plow that it will travel on the smooth base of the furrow. Any lateral movement caused by inequalities of the ground will be counteracted by the stabilizing rotor, which tends to retain the plow in the vertical position so that the operator does not have to resist the lateral movement of the plow, as it is only necessary to guide the plow and control the movement of the rotating parts.

It will b noticed that the cutter disk is located close to the plow point and extends to a level with the bottom of the share, thus preventing the plow engaging fixed rocks, or roots, as the cutter disk will ride over them and thus avoid injury to the mechanism.

When the end of the furrow is reached, the operator can step off of the platform. The spring will immediately lift the platform and the wheel out of the furrow, and, then, by longitudinally tilting the frame of the plow so as to raise the disk 11 and the plow proper, 10, clear of the ground, the entire plow can be turned laterally on the wheel 2 as a pivot so as to bring the plow in line to cut another furrow.

It will be seen by the above arrangement that I provide a plow with a single wheel, which will travel in the furrow and which can be readily turned, and which will remain in a vertical position without the necessity of the operator keeping the plow in position vertically, which, in rough ground, is a difficult matter.

A p'ow constructed according to my invention is compact and is comparatively inexpensive to manufacture. The machine can be used for other purposes than plowing by removing the cutting wheel 11 and plow 10, and applying another implement to it. It can also be used as a stationary engine for driving other light machines and, in some instances, a cover, or another plow, can be located at the rear of the traction wheel, if found desirable. The machine can also be used for hauling other implements.

I claim:

1. In a machine of the character described, the combination of a frame; an implement mounted on the frame; a single traction wheel also mounted on the frame; a motor for driving the wheel; a platform pivotally mounted at the rear of the frame; a wheel carried by the rear end of the platform; and means for raising the platform when the weight of the operator is removed therefrom so as to allow the main frame to be tilted about a horizontal axis and the implement to be elevated.

2. In a machine of the character described, the combination of a frame, a single traction wheel mounted thereon, a stabilizing rotor arranged within the periphery of the traction wheel, and a motor arranged within said stabilizing rotor in the plane of rotation of said rotor and traction wheel, and means associated with said motor for driving said traction wheel and stabilizing rotor, the speed imparted to the latter exceeding the speed imparted to the traction wheel.

3. In a machine of the character described, the combination of a frame; a single traction wheel mounted on the frame; a stabilizing rotor mounted within the wheel and also having its bearings in the frame, said rotor adapted to automatically substantially maintain the equilibrium of the wheel; a cylinder eccentrically mounted on the frame and located within the rotor; a piston in the cylinder; and a rod connecting the piston to the rotor.

4. The combination in a single wheel motor driven machine, of a frame; an implement carried by the frame; a single traction wheel of relatively narrow base mounted in bearings in the frame; a rotor concentric with the wheel and mounted within the wheel; a shaft secured to the hub of the stabilizing rotor; a jack shaft; a driving chain between the jack shaft and the rotor shaft; and a driving chain between the jack shaft and the traction wheel; an internal combustion engine eccentrically mounted in the frame in respect to the rotor and the traction wheel; a piston in the cylinder of the engine; and a rod connecting the piston with the rotor.

5. The combination in a motor driven machine of a frame; an implement attached to the frame; a single traction wheel mounted in the frame; a stabilizing rotor mounted within the wheel and having its end concentric with the frame; a shaft secured to the rotor; a jack shaft; gearing between the jack shaft and the shaft of the rotor and gearing between the jack shaft and the traction wheel; a cylinder of an internal combustion engine mounted in the frame eccentric to the rotor and the traction wheel, said cylinder being slotted; a piston mounted in the cylinder; a journal extending through the piston and through the slot in the cylinder; and a U-shaped connecting rod spanning the cylinder and engaging both ends of the journal and pivotally connected to the rim of the rotor.

6. In a machine of the character described, the combination of a frame; an implement mounted on the frame; a stabilizing rotor mouned within the said frame and journaled concentrically within the wheel; a concentric shaft secured to the hub of the rotor; a jack shaft; belting between the jack shaft and the rotor shaft; two sprocket wheels on the rotor shaft; a toothed ring on each side of the traction wheel; drive chains extending around the toothed rings and the sprocket wheels; a cylinder of an internal combustion engine mounted eccentrically on the frame in respect to the rotor; a piston mounted in the cylinder; a rod connected to the piston and to the rim of the rotor; a spark device carried by the cylinder; an electric terminal carried by the frame; a carbureter; a reservoir mounted on the frame back of the wheel; and a pipe forming communication between the reservoir and the carbureter, and the carbureter and the cylinder.

In witness whereof I affix my signature.

PIERCE R. McCRARY.